United States Patent
Nuti (10) Patent No.: US 12,321,860 B1
(45) Date of Patent: Jun. 3, 2025

(54) SYSTEM, NETWORK AND METHOD FOR SELECTIVE ACTIVATION OF A COMPUTING NETWORK INVOLVING SUPER-IMPOSABLE STOCHASTIC GRAPHS

(71) Applicant: SILVRETTA RESEARCH, INC., Larchmont, NY (US)

(72) Inventor: Giuseppe G. Nuti, Larchmont, NY (US)

(73) Assignee: SILVRETTA RESEARCH, INC., Larchmont, NY (US)

( * ) Notice: Subject to any disclaimer, the term of this patent is extended or adjusted under 35 U.S.C. 154(b) by 76 days.

(21) Appl. No.: 18/514,467

(22) Filed: Nov. 20, 2023

(51) Int. Cl.
G06N 3/08 (2023.01)

(52) U.S. Cl.
CPC ..................... *G06N 3/08* (2013.01)

(58) Field of Classification Search
CPC ........................................................ G06N 3/08
See application file for complete search history.

(56) References Cited

U.S. PATENT DOCUMENTS

| | | | |
|---|---|---|---|
| 5,517,596 | A | 5/1996 | Pechanek et al. |
| 7,904,398 | B1 | 3/2011 | Repici |
| 11,386,319 | B2 | 7/2022 | Le Gallo-Bourdeau et al. |
| 11,494,653 | B2 | 11/2022 | Zlotin et al. |
| 2019/0197391 | A1* | 6/2019 | Chen ............. G06N 3/063 |
| 2020/0019862 | A1 | 1/2020 | Pescianschi et al. |
| 2020/0364545 | A1 | 11/2020 | Shattil |
| 2022/0188605 | A1 | 6/2022 | Laszlo et al. |
| 2022/0237441 | A1* | 7/2022 | Soler Garrido ........ G06N 3/042 |
| 2023/0215498 | A1 | 7/2023 | Song et al. |

FOREIGN PATENT DOCUMENTS

JP 2004528559 A * 9/2004

OTHER PUBLICATIONS

JP2004528559A English Translation.*
"Synaptic mechanisms for generating temporal diversity of auditory representation in the dorsal cochlear nucleus" Mu Zhou, Ya-Tang Li, Wei Yuan, Huizhong W. Tao, andLi I. Zhang (Year: 2014).*
Han et al., "Dynamic Neural Networks: A Survey", Dec. 2, 2021.
Talpur et al., "A comprehensive review of deep neuro-fuzzy system architectures and their optimization methods", Neural Computing and Applications, Jan. 13, 2022.

(Continued)

*Primary Examiner* — Luis A Sitiriche
(74) *Attorney, Agent, or Firm* — Williams Mullen; Thomas F. Bergert (57) ABSTRACT

Embodiments of the present disclosure implement a stochastic neural network (SNN) where nodes are selectively activated depending on the inputs and which can be trained on multiple objectives. A system and/or network can include one or more nodes and one or more synapses, wherein each synapse connects a respective pair of the plurality of nodes. The system and/or network can further include one or more processing elements, wherein each of the processing elements is embedded in a respective synapse, and wherein each of the processing elements is adapted to receive an input and generate an output based on the input. In various embodiments, a super-imposable stochastic graph is employed with training, regularization and load balancing.

25 Claims, 7 Drawing Sheets

(56) References Cited

OTHER PUBLICATIONS

Lin et al., "A Closer Look at Branch Classifiers of Multi-exit Arcllitectures", Computer Vision and image Understanding, Jul. 13, 2022.
Wang et al.,"Neural network acceleration methods via seiective activation", IET Computer Vision, Nov. 21, 2022.
Han et ai., Abstract from "Leaming to Weigllt Samples for Dynamic Early-Exiting Networks", Nov. 3, 2022.
Yu et al., "Boosted Dynamic Neurai Networks", Nov. 30, 2022.

* cited by examiner

SYSTEM, NETWORK AND METHOD FOR SELECTIVE ACTIVATION OF A COMPUTING NETWORK INVOLVING SUPER-IMPOSABLE STOCHASTIC GRAPHS

TECHNICAL FIELD

The present disclosure relates to machine learning, and more particularly to a system, network and method for selective activation of a computing network.

BACKGROUND

Artificial neural networks (ANN) have become ubiquitous in machine learning. One of the main challenges with ANN is the need to compute the entire network for every data query and training, which renders the network unable to run multiple computations in parallel and unable to dedicate a variable amount of computational resources depending on the difficulty of the query.

Embodiments of the present disclosure implement a stochastic neural network (SNN) where nodes are selectively activated depending on the inputs and which can be trained on multiple objectives. The selective activation allows for executing queries in parallel on the same network, i.e., at the same time or substantially the same time. Advantages include the ability to construct and train large networks which only activate selectively depending on the inputs and that can run multiple parallel computations over the same network.

With stochastic neural networks, if the input is fixed, the output is likely to be different (i.e., stochastic, or random to a certain extent) for multiple evaluations. This is in contrast to deterministic neural networks, where the output over multiple evaluations is the same (deterministic) with a fixed input. For example, in a deterministic system or neural network, if an activation value for a node exceeds a threshold, the node fires. On the other hand, in a stochastic system or neural network, if the activation value exceeds a threshold, there is a probability associated with firing of the node. In other words, there is a probability of the node not firing or being activated even if the activation value exceeds the threshold.

A system according to embodiments of the present disclosure can include one or more nodes and one or more synapses, wherein each synapse connects a respective pair of the plurality of nodes. The system can further include one or more processing elements, wherein each of the processing elements is embedded in a respective synapse, and wherein each of the processing elements is adapted to receive an input and generate an output based on the input. The system, network and method can be configured to operate such that, upon receipt of a first problem input, a first subset of the nodes in the system is selectively activated. In various embodiments, once a synapse is computed, the sampling of the synapse determines whether the next node will be activated. In order to leverage both the stochastic nature of synaptic/node activation and the precision required to effectively train ANNs, inputs to the subsequent nodes will be the exact values of the incoming synapse as opposed to repetitive sampling. The computed value of a synapse may be used by a subsequent node/synapse even when the synapse is not activated. In other words, while the activation of a synapse/node is stochastic (and binary), once activated, embodiments of the present disclosure can choose to use the computed activation probability value instead of approximating it via repeated binary samples, significantly speeding up computation of subsequent synapses/nodes and finally the output values (i.e., the probability of activating one for the possibly multiple output nodes). According to embodiments, one or more of the synapses can feed into a node and activation of the node is dependent upon one or more activation weights of each of the synapses. Further, embodiments of the system, network and method of the present disclosure operate such that different network regions can be activated for different inputs and this activation can occur in parallel.

Embodiments of the present disclosure also provide a method for partially or selectively activating a computing network, where the network includes multiple nodes and multiple synapses, where each of the synapses connects a respective pair of nodes. Each synapse has one or more respective activation weights, and a first subset of the nodes is selectively activated based on a first problem input. Each node is not necessarily activated for each problem input. In various embodiments, a super-imposable stochastic graph is employed with training, regularization and load balancing.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a node may encompass one or more nodes, reference to a synapse may encompass one or more synapses and so forth.

Figure 1:
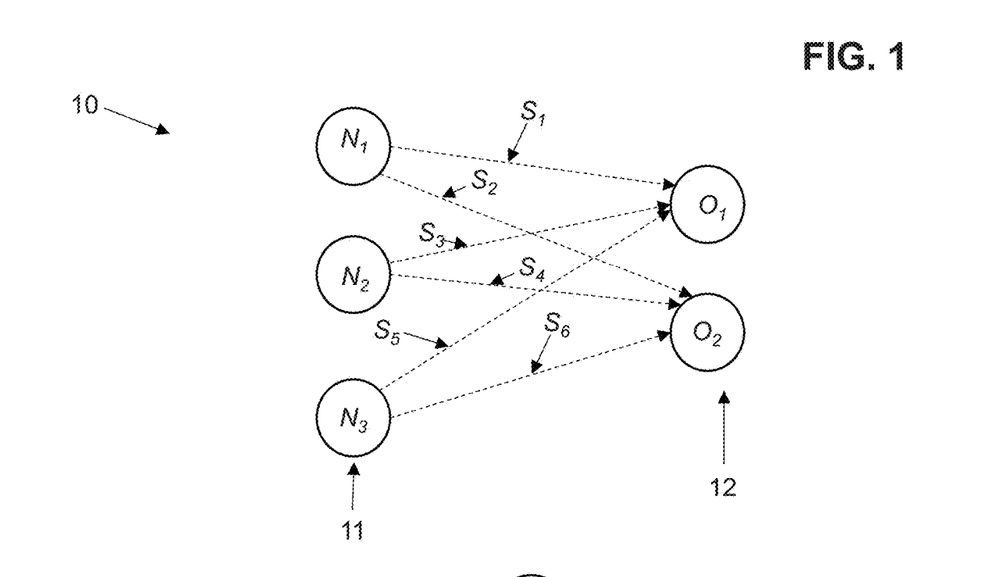
FIGS. 1 and 2 are diagrams of stochastic neural networks in accordance with embodiments of the present disclosure.

As shown in the network 10 of FIG. 1, input nodes $N_1$, $N_2$ and $N_3$ are indicated generally at 11 and output nodes $O_1$ and $O_2$ are indicated generally at 12. Each of the input nodes $N_1$, $N_2$ and $N_3$ has a respective synapse extending to a respective output node $O_1$ and $O_2$. For example, synapse $S_1$ extends from input node $N_1$ to output node $O_1$, synapse $S_2$ extends from input node $N_1$ to output node $O_2$, synapse $S_3$ extends from input node $N_2$ to output node $O_1$, synapse $S_4$ extends from input node $N_2$ to output node $O_2$, synapse $S_5$ extends from input node $N_3$ to output node $O_1$, and synapse $S_6$ extends from input node $N_3$ to output node $O_2$.

Each of the synapses $S_1$-$S_6$ has a respective processing element embedded therein, wherein each of the processing elements is adapted to receive an input and generate an output based on the input. Each of the synapses further has one or more respective activation weights associated therewith. Thus, synapse $S_1$ has at least an activation weight $w_1$ associated with it, synapse $S_2$ has at least an activation weight $w_2$ associated with it, synapse $S_3$ has at least an activation weight $w_3$ associated with it, synapse $S_4$ has at least an activation weight $w_4$ associated with it, synapse $S_5$ has at least an activation weight $w_5$ associated with it, and synapse $S_6$ has at least an activation weight $w_6$ associated with it.

Figure 2:
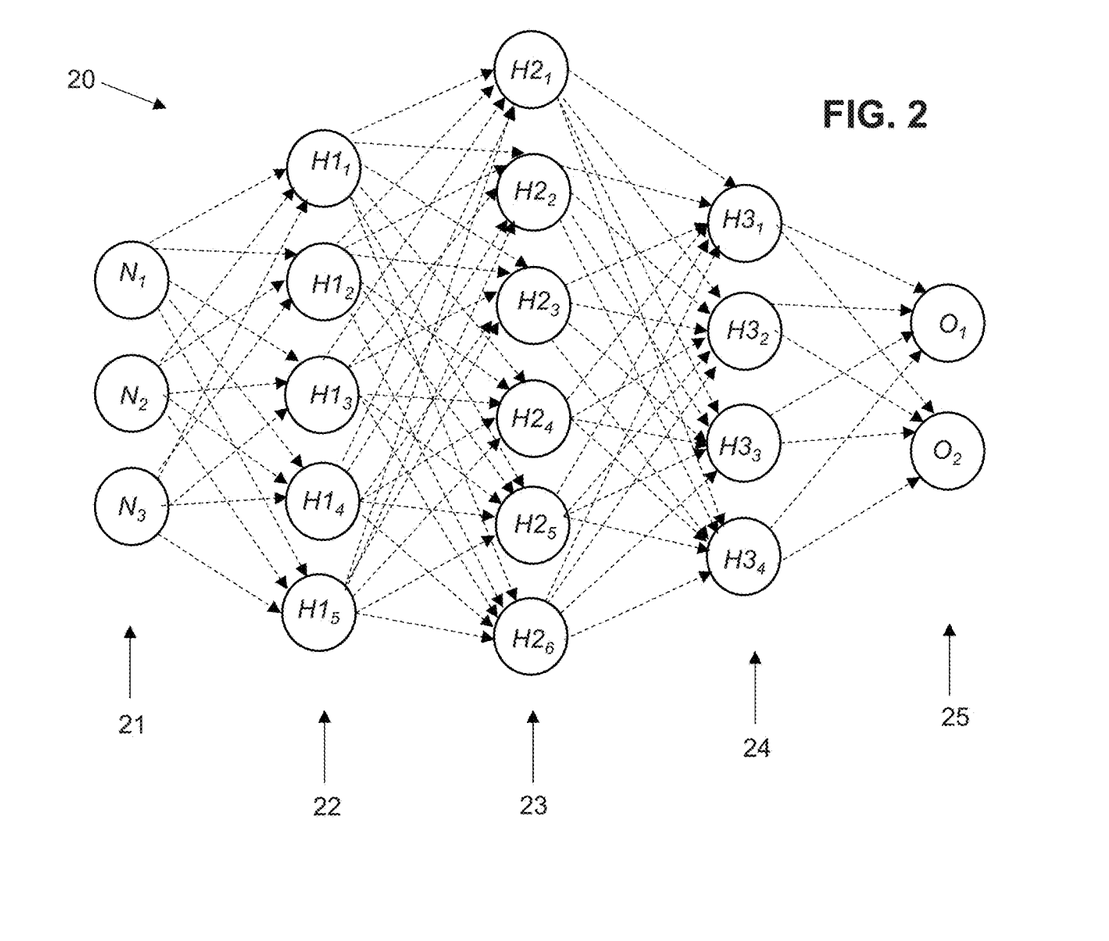

FIG. 2 shows a larger network 20 than network 10, with input nodes illustrated generally at 21, a first set of hidden layer nodes indicated generally at 22, a second set of hidden layer nodes indicated generally at 23, a third set of hidden layer nodes indicated generally at 24 and output nodes indicated generally at 25. The input nodes $N_1$. $N_2$ and $N_3$ have respective synapses extending from the input nodes $N_1$. $N_2$ and $N_3$ to each of the hidden layer nodes $H1_1$, $H1_2$, $H1_3$, $H1_4$, $H1_5$ and $H1_6$ in the first hidden layer 22. The nodes $H1_1$, $H1_2$, $H1_3$, $H1_4$ and $H1_5$ in the first hidden layer 22 have respective synapses extending to each of the hidden layer nodes $H2_1$, $H2_2$, $H2_3$, $H2_4$, $H2_5$ and $H2_6$ in the second hidden layer 23. The nodes $H2_1$, $H2_2$, $H2_3$, $H2_4$ $H2_5$ and $H2_6$ in the second hidden layer 23 have respective synapses extending to each of the hidden layer nodes $H3_1$, $H3_2$, $H3_3$, and $H3_4$ in the third hidden layer 24. The nodes $H3_1$, $H3_2$, $H3_3$, and $H3_4$ in the third hidden layer 24 have respective synapses extending to each of the output nodes $O_1$ and $O_2$. It will be appreciated that embodiments of the present disclosure can operate in networks that are not fully connected, as well as networks where nodes may skip one or more layers. Nodes may be connected to neighboring nodes both within the same layer and/or in subsequent layers.

Thus, as shown in FIGS. 1 and 2, each of the preceding synapses can feed into a node. Further, activation of each node is dependent upon the activation status of each of the synapses that feed into it. As examples of embodiments of this invention, a node can stochastically activate in a variety of situations, such as: (i) if any of the incoming synapses are activated, (ii) if all of the synapses are activated, (iii) if a transform of the incoming synapses is activated and/or (iv) if a minimum total activation status is achieved from the incoming synapses. It will be appreciated that the one or more activation weights associated with one synapse can be different from the one or more activation weights associated with a different synapse. As further shown in FIGS. 1 and 2, each node feeds into each of the subsequent synapses.

According to the present disclosure, the activation weights (and optional non-linear activation functions) are at the synapse level instead of at the node level. This is required in order to allow for distinct activation routes for different calculations throughout the network. In other words, the gating is embedded in the synapse and no separate gate or other components are required. Further, the presently disclosed system, network and method employ stochastically activated nodes for which the computation is driven by a stochastic function of the activation value. As described elsewhere herein, the present system, network and method provide synaptic stochastic activation where the parameters of the network that control the activation and the output transform are embedded in the synapses between nodes instead of in the nodes. This ensures that calculations are selectively propagated throughout the network, as opposed to past neural networks having the computation unit in the node which is then broadcast to all the subsequent nodes.

As an example, the synaptic-specific value can be represented by the activation of any one incoming synapse into the predecessor node:

$$g(p(n_1, \ldots, n_i)) = 1 - \prod^{j=1,\ldots,m}\left(1 - \left(\sigma\left(w_0 + \sum^{j=1,\ldots,i} w_j p(n_j)\right)\right)_m\right)$$

where n represents node, p represents probability, w represents activation weight and the subscript m indicates the $m^{th}$ incoming synapse into a node. The above, in essence, represents the probability that any of the incoming synapses into a node is activated.

As an alternative formulation, the synaptic-specific activation for the subsequent node can be expressed as a function of a common node value, e.g.:

$$g(p(n_1, \ldots, n_i)) = \left(\sigma\left(w_0 + \sum^{j=1,\ldots,i} w_j p(n_j)\right)\right)^\gamma$$

where, in this case the m subscript is dropped as there is a common value computed at the node level which is then modulated by each synapse with a distinct activation level, namely Y. The above node activation function, g(.), can then be joined with the node or synaptic commuted values (for example, by multiplying the synaptic/node signal value with the node activation value). The combination of signal and activation probability (of the synapse computing the signal) allows the network to send both the signal and its activation probability, thus enabling the training to simultaneously occur both on the signal and the activation probability.

The value of the synaptic output can be either the stochastic value or the computable value given currently activated input synapses. In other words, the present disclosure can provide a fully stochastic network or, more efficiently, a fire-and-compute approach where, once a synapse is positively activated, the output value is computed with full or quantized precision taking input from all of the activated synapses during this path or any previous path computed on this input vector. The computation of the network can be done via multiple paths that can be fired simultaneously, whereby any path activating an output node further increases the precision of the output value until sufficient precision is obtained or a maximum number of paths have been fired. Specifically, a path runs through the network activating nodes stochastically based on the activation probability defined above. In its simplest form, the terminal value can be estimated at one of the possible multiple output nodes by accumulating the number of activated nodes. To speed up calculation, the network can run in hybrid mode where a computed (yet not necessarily activated) synapse is then used as a full-precision numerical value instead of an active/inactive binary value. This provides the technical advantage of automatically computing what the approximate estimation of firing multiple paths would yield. Training of the stochastic network can occur over all computed synapses or only the activated synapses. In other words, once a synapse and/or node is activated, using the probability of activation will compute the outcome probabilities without having to fire multiple paths to estimate such probabilities, yet the firing of a node and/or synapse is done stochastically to determine if subsequent nodes need to be sampled. Furthermore, using the hybrid fire-and-compute approach provides embodiments of the present disclosure with the ability for a synapse/node to use previously computed values unless a new input to such synapse/node has stochastically been activated and computed, thus providing the technical advantage of saving significant computational resources.

Beyond synaptic-specific parametrization, the inference approach according to the present disclosure can be done via multiple paths which traverse the network activating nodes independently. For efficiency and as a significant speed-up in the inference convergence, the information computed by a path can be utilized by any subsequent path traversing the same node. In essence, the computation is an approximation which becomes progressively more precise as more paths activate the synapses, with the limiting case that an infinite number of paths would activate the entire network. The number of paths needed will depend on the stability of the approximation as more paths reach a specific target node, thus providing a fast approximation which gets refined as more paths travel through the network. The employment of a fast approximation followed by more precise, yet time consuming, solutions can be critical for time-sensitive decisions, such as in self-driving car applications and more generally, in robotic applications, for example.

It will be appreciated that in order to simultaneously train for the solution of the inference problem(s) and provide computational efficiency, the output value and probability of activation are jointly optimized according to the present disclosure, ensuring that the network is trained to output values that minimize the error with respect to the desired output and its activation. Thus, the objective function and the transformations from input into any of the output nodes includes both the transformed output and the likelihood of the output node being activated (or a derivative, i.e., functional transformation, thereof). Importantly, multiple output nodes can be part of the same network (not necessarily mutually exclusive), selectively employing network resources based on the inputs.

In various embodiments, an output node can be constructed with a soft max connecting all mutually exclusive values (including true/false only) to ensure that training is unbiased with respect to activation proportions of output values. In other words, an output node activating only when its value is true may provide a biased training to the network parameters. The network can be further segregated between positive activation inner layers and negative activation inner layers that can be fully separated or only partially separated, and which eventually connect to the respective true or false inputs of an output node, or, more generally, one of the categorical values of an output node.

Training optimizes the output value and probability of activation, ensuring that the network is trained to output values that minimize the error with respect to the desired output and the activation. The objective function and the transformations from input into any of the output nodes includes both the transformed output and the likelihood of the output node being activated (or a derived value, i.e., functional transformation, thereof). As described herein, multiple output nodes can be part of the same network (not necessarily mutually exclusive), selectively employing network resources based on the inputs.

Regularization can be applied as per approaches understood in the art (e.g., lasso or L1 regularization and/or ridge or L2 regularization) or by evaluating the co-activation of input synapses: the more correlated the activation is, the less useful it will likely be. The ability to assess co-activation as a proxy for the usefulness of an incoming synapse provides forms a natural regularization method based on the uniqueness of activations where two inputs that are highly correlated can be merged into one while recycling the unused synapse by drawing new random weights with a de minimis new input weight. Among other things, this promotes efficient utilization of network resources.

It will be appreciated that nodes need not connect only to the next layer but can connect with layers further out, which can improve performance in that the connection layer can be chosen from a uniform distribution of layers available before the output node, or using other methods, such as a geometric distribution, for example. Furthermore, nodes need not be fully connected to the next layer.

Figure 3:
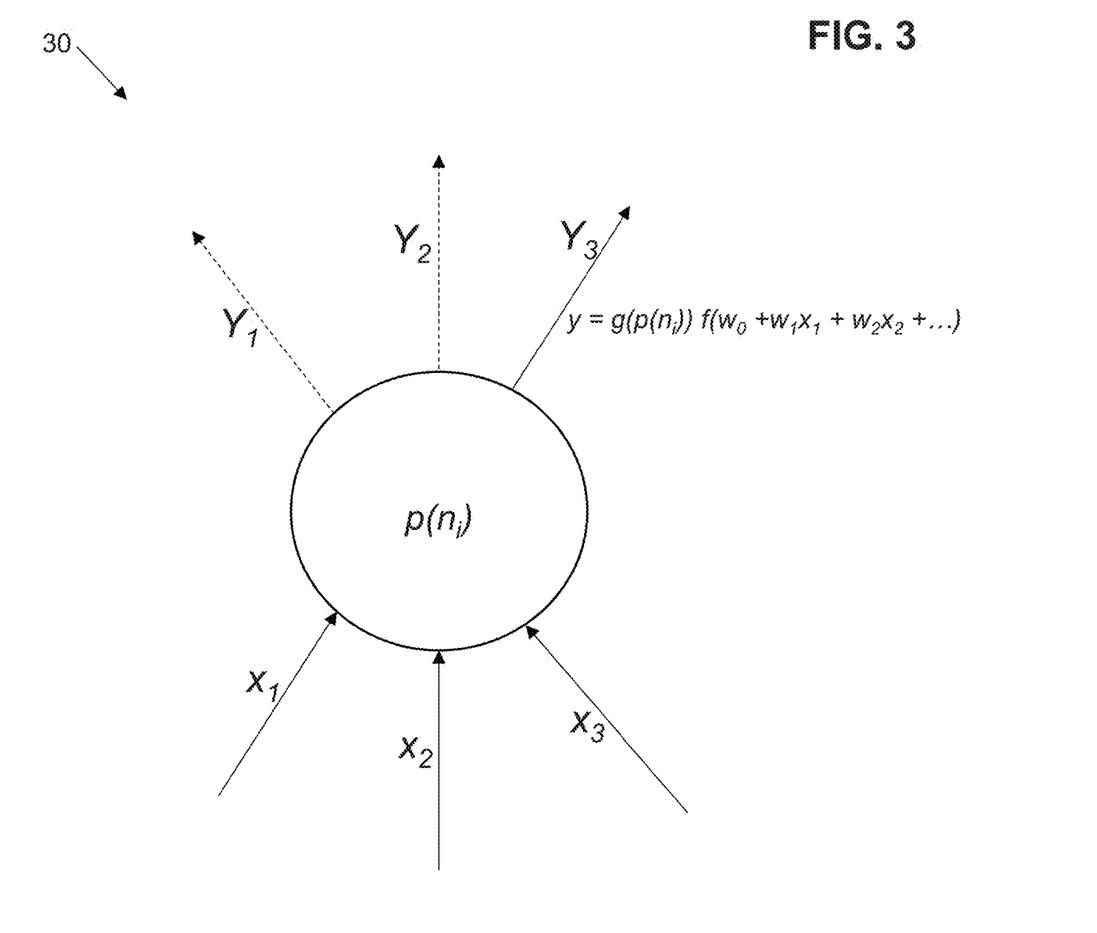
FIGS. 3, 4 and 5 are diagrams of a node with incoming and outgoing synapses in accordance with embodiments of the present disclosure, illustrating node activation.

As shown in diagram 30 of FIG. 3, the probability of node i being fired is represented as $p(n_i)$. In various embodiments, node activation depends on each incoming synapse's value as described elsewhere herein. In FIG. 3, incoming synapses are shown at $X_1$, $X_2$ and $X_3$. Each synapse $X_1$, $X_2$ and $X_3$ has its own unique set of weights, which are and/or can be distinct from the weights of other synapses extending from a given node and includes a function of the node activation $g(.)$. In FIG. 3, the outgoing synapses are shown at $Y_1$, $Y_2$ and $Y_3$. Once a node is activated, all synapses originating from it are sampled, though not necessarily activated as described elsewhere herein.

According to various embodiments, the value that modulates the activation function (namely $g(.)$ in FIG. 3) can be the probability of activation of the node (e.g., the probability of at least one incoming synapse being activated, noting that continuous network input values may be always activated and logical input values can be either always activated or activated only if belonging to a specific class), the probability of all synapses activating, or any function that defines the desired activation link between the output node and the input nodes.

In order to build networks that activate selectively over regions that can span multiple layers, it is necessarily true that information flowing out of a node must be different for different destination nodes. As such, as disclosed in various embodiments herein, there is a shift in computation from the node into the synapses. This allows for each synapse to convey independent information with respect to other synapses stemming from the same node, as depicted in diagram 35 of FIG. 4. In essence, the three key components of synapse-node interaction are (1) $p(n)$, which is the probability of activation for node n; (2) $\sigma_i(.)$, which is the signal computed within synapse I; and (3) $S_i$, which is the output of synapse i.

Figure 4:
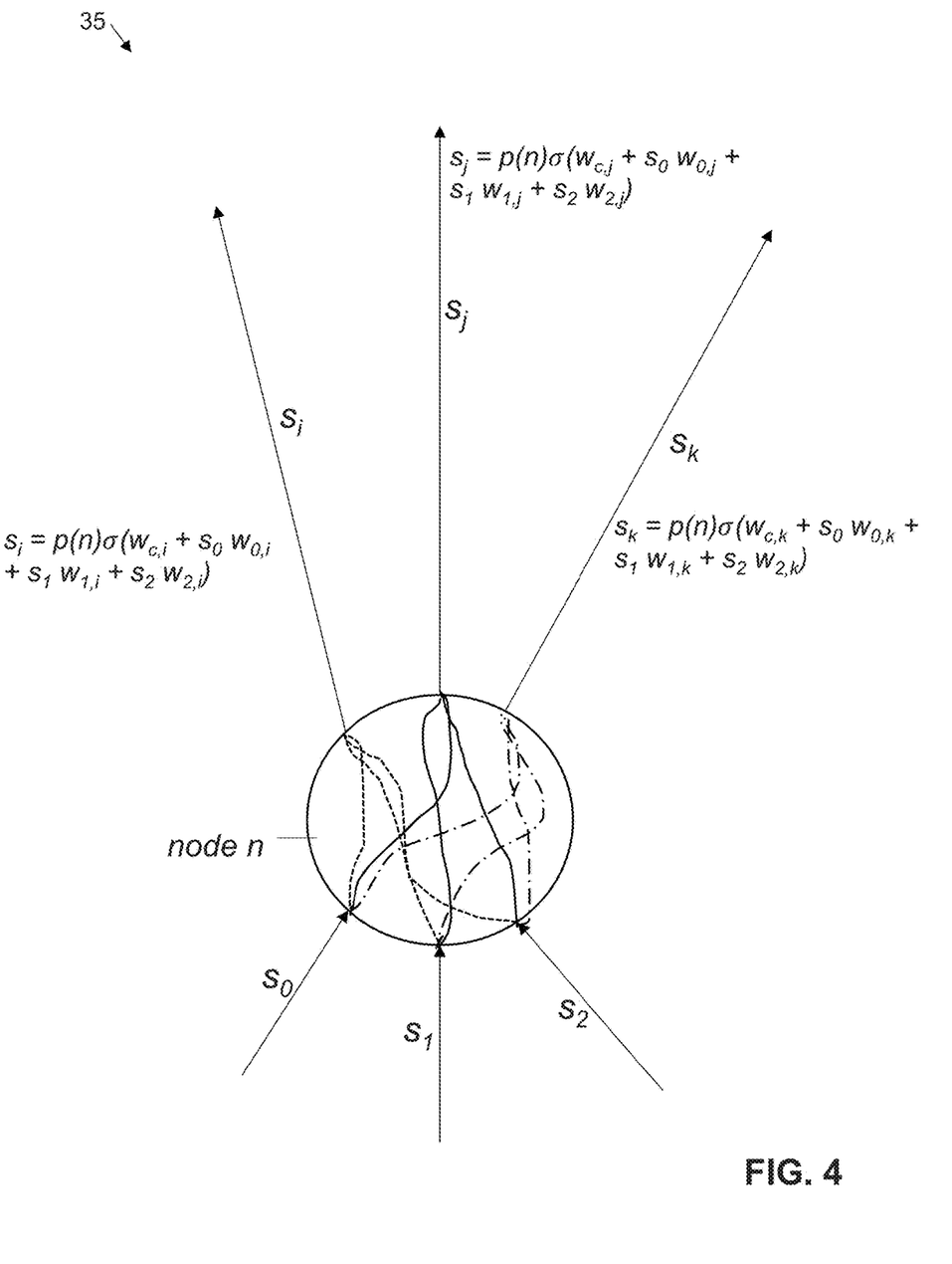

As shown in diagram 35 of FIG. 4, node n has incoming synapses, $S_0$, $S_1$ and $S_2$, and outgoing synapses, $S_i$, $S_j$ and $S_k$, and $p(n)$ stochastically controls whether node n's synapses will be computed and potentially further activate the nodes to which each outgoing synapse is connected. Each outgoing synapse has a unique set of weights directly connected to the origin node's incoming synapse. Thus, $w_{2,i}$ is different from $w_{2,j}$ and $w_{2,i}$ and $w_{2,j}$ are each different from $w_{2,k}$. In various embodiments, at least a subset of the weights can be the same for different synapses. Within the construct of independent synaptic computation, it will be appreciated that the connection of each synapse to its origin node's incoming synapses need not be exhaustive; in other words, any combination of internal connections (which can differ for each outgoing synapse) forms a viable solution-including some shared weights across a subset of synapses. Each synapse can be stochastically activated based on its value, as per Equation 1 below for the simplest form of activation for synapse $S_i$ (with $p(S_i)$ being the probability of synaptic activation, $\sigma(y)=1/(1+e^{-y})$ (being the signal), e.g., the standard sigmoid non-linear activation, and $S_1, \ldots, S_m$ being the origin node's input synapses):

$$p(s_i) = s_i \qquad \text{Equation 1}$$

$$= \sigma\left(w_{0,i} + \sum_{k=1}^{m}(w_{k,i} s_k)\right)$$

In various embodiments, each synapse has, at least in part, its own set of weights, w., i, that differ from other synapses' weights originating from the same node. This allows for each synapse stemming out of a node to be selectively activated depending on its origin node's inputs.

In view of the above equation 1 representing synaptic activation, the effects on a node and its outgoing synapses following a synaptic activation can be determined. An example probability of node activation for an OR gate is shown in equation 2 below, and an example probability of node activation for an AND gate is shown in equation 3 below.

$$p_{OR}(n) = 1 - \prod_{k=1}^{m}(1 - s_k) \qquad \text{Equation 2}$$

$$p_{AND}(n) = \prod_{k=1}^{m} s_k \qquad \text{Equation 3}$$

Figure 5:
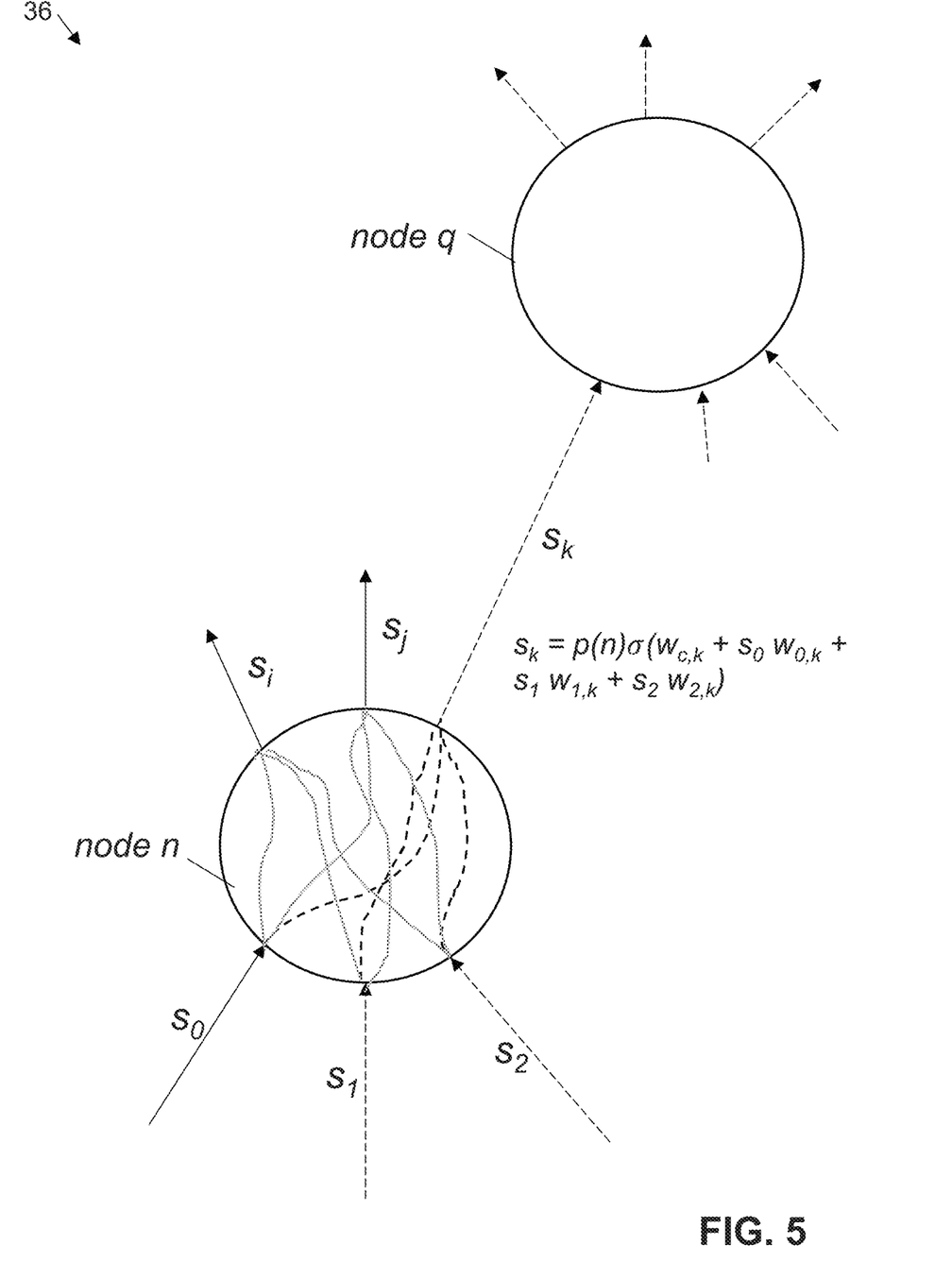

It will be appreciated that equations 2 and 3 are only subsets of possible node activation functions. Regardless, any activated node will fire the computation of all outgoing synapses from that node. The diagram 36 in FIG. 5 shows an example of a sequence of events for node and synaptic activations. As shown therein, the dashed lines for synapses $S_1$ and $S_2$ indicate activated synapses whereas the solid line for synapse $S_0$ indicates a non-activated synapse. Using an OR-node, the activated synapses $S_1$ and $S_2$ cause node n to be activated, which results in outgoing synapses (e.g., $S_k$) being computed. Each outgoing synapse computes its output value independently, and the output value determines the probability of stochastic synaptic activation. If synapse $S_k$ is activated, it will in turn activate node q which will begin the computation of all of node q's outgoing synapses. The stochastic activation of the synapse (e.g., $S_k$) is parametrized by the synaptic output. For example, if $S_k=0.85$, in its simplest form, the probability of activation is 0.85 for every origin node activation.

According to embodiments of the present disclosure a super-imposable stochastic graph (SSG) can be considered a combination of three intertwined stochastic processes. The first process is, for a fixed graph where the set of computed synapses is immutable, the output of the network is a stochastic process (e.g., a branching process). The second process involves the computation of new synapses given a current set of computed synapses (and an input vector), as a Markov process, where the next state, defined as the set of computed synapses, is driven exclusively by the current state, namely the currently computed synapses. The third process is updating of the network's parameters via a Markov decision process, where the action set is the available changes to the parameters and the current state is defined as the values of the parameters.

In creating a trainable SSG according to embodiments of the present disclosure, the probability of node activation is embedded into the outgoing synapses such that an output node's probability of activation is dependent on the chain of all node activations that have resulted in the computation of the output node. This can be represented as equation 4 below.

$$s_i = p(n)\sigma\left(w_{0,i} + \sum_{k=1}^{m}(w_{k,i} s_k)\right) \qquad \text{Equation 4}$$

where n is the synapse's origin node and where the synaptic output is used directly for the probability of synaptic activation, i.e., $p(S_i)=S_i$ as per equation 1, for example.

At the core of the SSG construct according to embodiments as disclosed herein, network calculations are repeated multiple times for each input vector, with each computation being termed a path and the collection of paths associated with an input vector being termed a wave. In essence, a path starts from the input vector from each input node that is activated and traverses the network, activating subsequent nodes and synapses as described above. Specifically: (a) each path will calculate the synaptic values of activated nodes and, upon successful synaptic activation, any subsequent nodes (according to the activation function); (b) paths can run concurrently on the network, either overlapping or indexed by input vector (i.e., query) and multiple paths for the same input can traverse the network concurrently as well as multiple paths for different input vectors; (c) a synaptic computation is remembered for future paths that may arrive at the same node, noting that the synaptic values can be updated by subsequent paths that index the same input vector; (d) paths can be computed synchronously, i.e., network layers are activated sequentially only once all nodes for a layer have been computed, or asynchronously, i.e., nodes and synapses are computed as and when a successful synaptic activation fires subsequent nodes, noting that all the results can be based on asynchronous calculations; and (e) the number of paths required (e.g., the size of the wave) is determined by the stability of the solution, which can be capped by a parametric upper bound.

The significant speed-up of network calculations in the SSG stems in part by the ability to run paths concurrently, noting that, unlike standard neural networks, the calculation and/or computation lock is now within each independent synapse and not within each node that broadcasts the same output value to its subsequent nodes. This allows for effective parallel computation of paths, which can be further improved by regularizing the co-activation probability, i.e., the probability that multiple incoming synapses would activate a node or that activate a node that is already activated. With this construct, fully connected networks make little sense, preferring nodes that connect to neighboring nodes and/or skip directly to subsequent layers. The idea of remembering the synaptic values activated by previous paths results in utilizing the computational resources already spent. For example, every path that traverses the network either uses the previously computed synaptic values or further refines the calculation, reducing the approximation error with respect to a full network computation. Since the probability of activating a synapse is the same as the value of the synapse, synapses with low likelihood for a given input vector will have a small impact on the approximation error. Furthermore, unless a new synapse has been activated, a path is just tasked with drawing a random number, and thus can be executed extremely quickly in computational terms. This is akin to drawing a number of different computational graphs (based on the number of paths), where each subsequent path further refines the solution by computing an ever-increasing number of synapses.

According to embodiments of the present disclosure, the assessment of when to stop drawing more paths is contemplated. In various embodiments, the difference between the latest output and the exponentially-weighted moving average (ewma) of the output is evaluated, subject to a minimum number of activating paths. This can be represented as in equation 5 below, where $o_n$ is the $n^{th}$ path's output value for output node o, and its moving average $\hat{o}_n$ $$\hat{o}_n = \lambda \hat{o}_{n-1} + (1 - \lambda) o_n \qquad \text{Equation 5}$$

Paths are generated for a minimum count and for as long as $|\hat{o}_n - o_n| \geq \epsilon$, i.e., for as long as the absolute difference between the latest ewma of the output node (with half-life parameter $\lambda$) and the latest output node is greater than a given threshold E. In various embodiments, default values can be used as follows: $\hat{o}_0 = 0.5$, $\lambda = 0.1$ and $\epsilon = 0.01$. It will be appreciated that the error threshold, $\epsilon$, can be automatically adjusted by the certainty of the prediction, setting the overall stopping condition of equation 5 to be less than $\epsilon / \hat{o}_n (1 - \hat{o}_n)$. Through this approach of drawing multiple paths, computable in parallel, where each subsequent path further reduces the approximation error intrinsic in computing only a portion of the entire network, a network is provided whose nodes selectively activate and present more activated nodes for harder-to-solve problems, with a computational time that is proportional to the difficulty of the problem (i.e., more paths for less certain input queries), and a series of approximations to the solution that gets progressively better with more computational resources.

It will be appreciated that embodiments of the present disclosure provide for nodal output diversity, where the purpose is not to prune a large network into a smaller one with comparable performance but rather to utilize a small part of the network for any single inference task, yet as much of the network as possible over all possible inference tasks. To promote this computational load-balancing via nodal activity diversity, the output is diversified over time which may be equivalent to diversifying over multiple inference samples. In essence, promoting the broader use of the network improves the stability and resilience of the inference process and, depending on the type of hardware implementation, speeds up the computation by allowing rest-time for synapses.

Multiple approaches can be employed according to the present disclosure for nodal output diversity. For instance, one approach minimizes the synaptic output autocovariance subject to maintaining the branching process' criticality. The output of a single node across its outgoing synapses can be defined as a vector:

$$\vec{s}_t = \{s_1^{(t)}, \ldots, s_n^{(t)}\}$$

where the subscript t for the entire vector represents time or inference task.

Objectives in setting the vector $\vec{s}_t$ include (a) to diversify the output over time, i.e. to ensure that $\vec{s}_t$ is different from $\vec{s}_{t-i}$, proportionally to i; (b) to maintain the branching process' criticality, for example, by ensuring the sum of the input synapses is similar to the sum of the output synapses; and (c) to have synaptic output values tend towards the extremes of zero and one, notwithstanding the above, to ensure stability of activation. The output vector can be considered as a soft binary address which needs to distinguish the possible inputs to a node as much as it is possible given the number of outputs it has and the criticality constraint. A simple approach to achieve our objectives is to maximize the discounted auto-covariance such as by equation 6 below.

$$\sum^i \left( f(i) \ln\left( \sum^k (s_k^{(t)} - s_k^{(t-i)})^2 \right) \right) \qquad \text{Equation 6}$$

subject to the constraint that the sum of the input synapses is similar to the sum of the output synapses and f(.) a discount function, such as $f(i) = e^{-\beta i}$. Keeping track of numerous historical output values may be memory-intensive. In various embodiments, equation 6 can be approximated by keeping track of the ewma of the output per equation 7

$$\hat{s}_i^{(t)} = \alpha \hat{s}_i^{(t-1)} + (1 - \alpha) s_i^{(t)} \qquad \text{Equation 7}$$

and maximizing equation 8.

$$\ln\left( \sum^k (s_k^{(t)} - \hat{s}_k^{(t-1)})^2 \right) \qquad \text{Equation 8}$$

The logarithm in equations 7 and 8 ensures that the additional value of a temporal difference diminishes as the vectors become more dissimilar. This approach can be tested by looking at the ability of a node to distinguish m input patterns using its input and output synapses. For example, transforming the soft binary address, $\vec{s}_t$, into an actual binary address (by setting to 1 any output greater than 0.5, to 0 otherwise), m=5 distinct inputs can be successfully discerned over 90% of the time, generated by Gaussian k-means, with k=5, bound between 0 and 1, using 5 input and output synapses.

As an alternative approach to nodal output diversity, a synaptic firing rate can be targeted (or, more effectively, the firing rate of the destination node of a synapse). This can be done in a variety of different ways. For example, and following the same notation above $\vec{s}_t = \{s_1^{(t)}, \ldots, s_n^{(t)}\}$, the discounted sum of synaptic activation for synapse i at time t for a discount factor $\gamma$ can be maintained as equation 9 below.

$$\bar{s}_i^{(t)} = \bar{s}_i^{(t-1)} + \gamma s_i \qquad \text{Equation 9}$$

This permits direct targeting of the synaptic firing rate by adding a penalty, c, for a deviation of the discounted sum of synaptic activation for synapse i at time t from a target firing rate η according to equation 10.

$$c = (\overline{s}_i^{(t)} - \eta)^2 \qquad \text{Equation 10}$$

where η(.) can be a fixed parameter, a function of the number of outgoing synapses, a function of the input and/or activation probability of the incoming synapses, or a function of the activation state of the output synapses (or nodes), such as a deviation from the average firing rate of all outbound synapses of a node, which would directly model an average computational load-balancing. In essence, the aim is for a specific average activation probability over time, which is (1−γ)η in a steady state.

In an effort to join the need to regularize (limit) resource usage alongside fostering an evenly balanced computational load, resource usage, r, can be defined for a given inference point as the total (or path-wise maximum) discounted computed synapses (or nodes), where each synapse i has a resource utilization according to equation 11.

$$r_i = 2 e^{(\theta \Delta t)} - 1 \qquad \text{Equation 11}$$

with a discount parameter θ and Δt the difference between current time (or training cycle) and the last time this synapse was trained. Equation 11 will foster both a parsimonious activation of nodes and nodal diversity since a synapse not recently used will incur a negative cost. It will be appreciated that a monotonically not-increasing function of the more general concept of synaptic/node utilization will suffice. Optimizing for a minimum squared total resource usage is helpful since, with the formulation of equation 11, a negative score could potentially be achieved.

Figure 6:
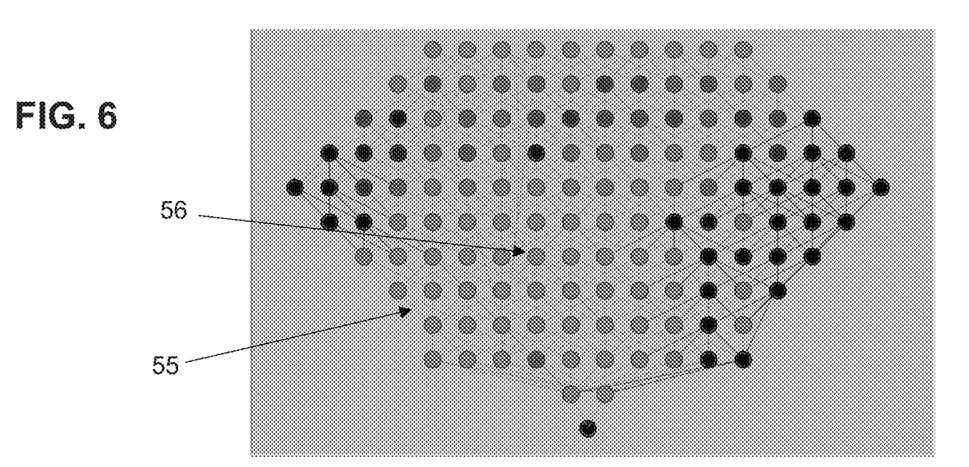
FIGS. 6 through 8 are diagrams of activation networks with varying regularization penalties in accordance with embodiments of the present disclosure.
Figure 7:
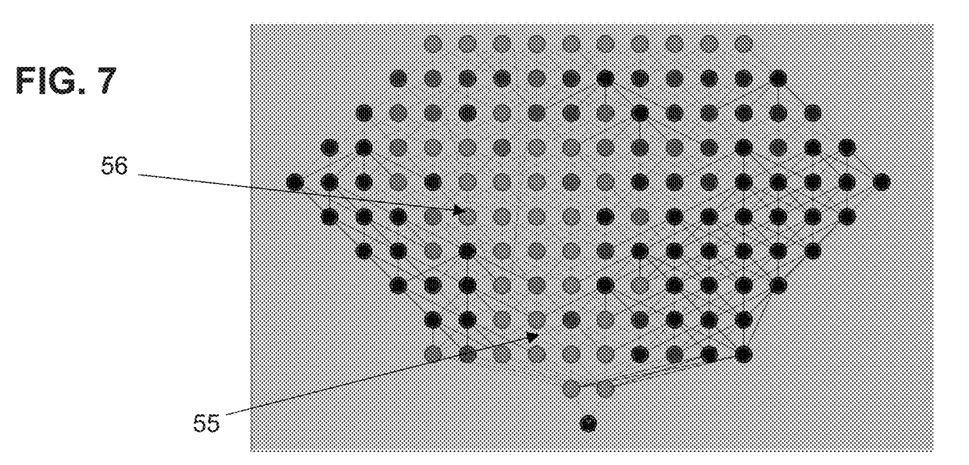
Figure 8:
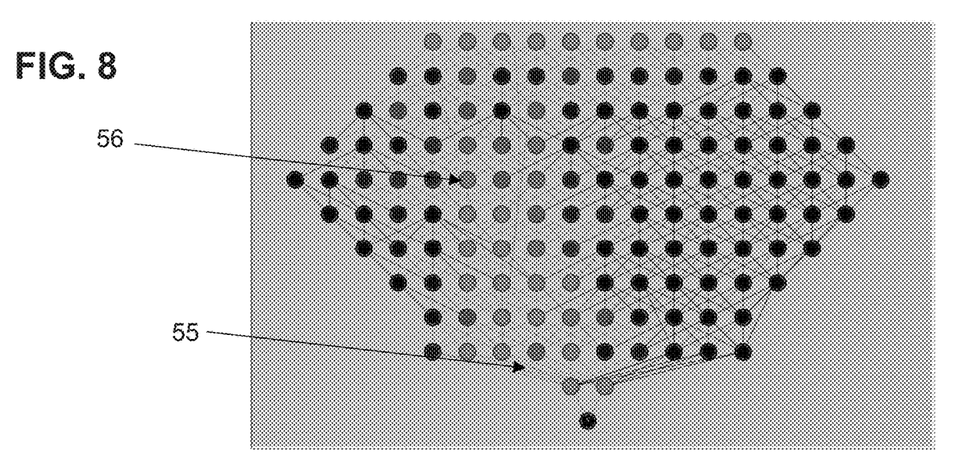

To see the effect of this regularization parameter, FIGS. 6 through 8 show an activation network for three regularization penalties (0, 0.01, and 0.02), respectively. The lighter shaded lines as exemplified at 55 are activated synapses and the lighter encircled nodes as exemplified at 56 are activated. The lighter the shade of a node, the higher the probability of activation and the darker the shade of a node, the lower the probability of activation. As can be seen, the higher the regularization penalty, the lower the number of activated nodes though the out of sample fitting results are comparable.

Figure 9:
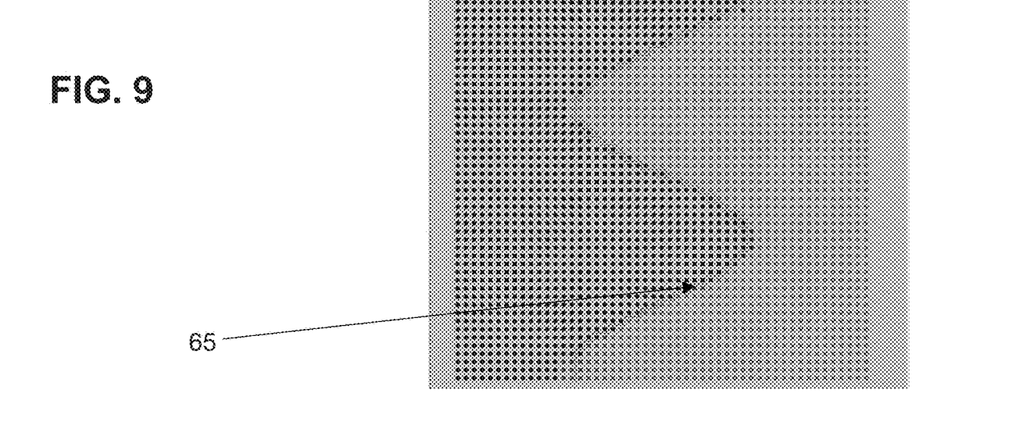
FIGS. 9 through 11 are diagrams illustrating fitted results for sinusoidal synthetic data for different levels of nodal diversity regularization in accordance with embodiments of the present disclosure.
Figure 10:
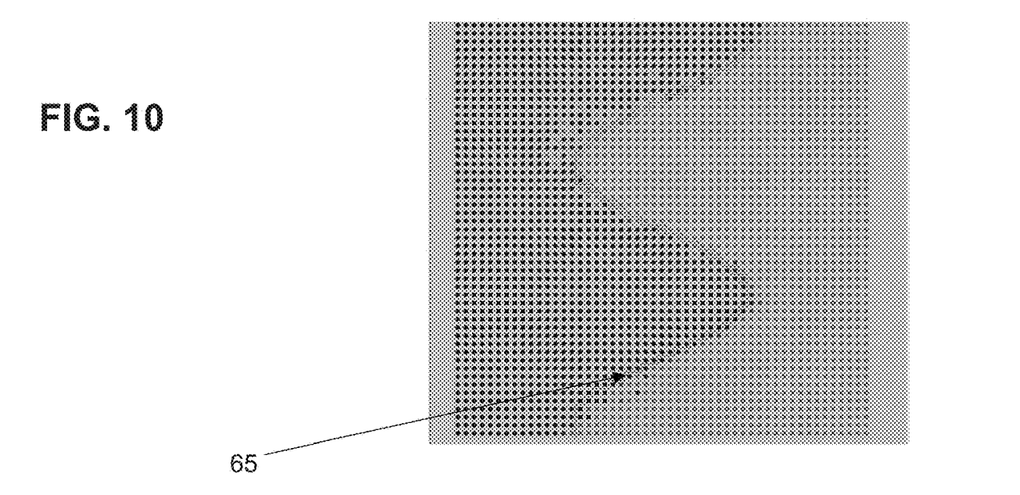
Figure 11:
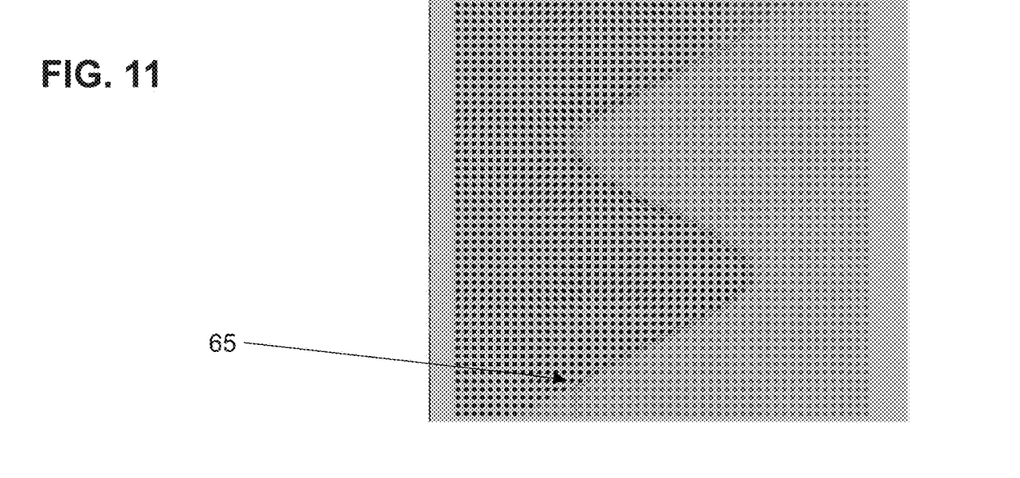

FIGS. 9 through 11 show the out of sample fitted results for sinusoidal synthetic data for different levels of nodal diversity regularization, with line 65 depicting the ground truth.

In Table 1, the effect of regularization on the average number of computed synapses and activated synapses over the last 1,000 observations, alongside the minimum and maximum number of computed synapses over the same window can be seen. As shown in the last two columns of Table 1, a higher nodal diversity regularization parameter yields a wider min-max range of computed synapses.

TABLE 1

| Regularization | Computed | Activated | Min | Max |
|---|---|---|---|---|
| 0 | 0.79 | 0.56 | 0.73 | 0.89 |
| 0.01 | 0.58 | 0.26 | 0.41 | 0.97 |
| 0.02 | 0.52 | 0.25 | 0.28 | 0.72 |

The construct defined in equation 4 above (alongside a node activation definition such as equation 2, for example) can be viewed as the dual problem of solving for minimizing the output error and setting the computational graph (i.e., which nodes and synapses will be activated). For SSGs as disclosed herein, straight-through backpropagation can be employed, despite the bias that will be understood to one of skill in the art. It will be appreciated that for every training computation, only the computed synapses and the activated nodes need to be updated, understanding that the set of activated synapses may be different from the set of computed synapses. Specifically, only the synapses that contributed to the output node initiating the training need to be updated. It will further be appreciated that, just as the output is determined by the selective activation of nodes and synapses, the training can back-propagate from each output node to the input nodes, updating only the computed notes (since non-computed synapses have a default value of zero, and, given that they were not computed, a likely true value near zero). It will further be appreciated that the synapses that were not activated require a specific training inasmuch as an inactive synapse prevented a different computational graph from being activated. It will further be appreciated that for multiple output nodes (multi-objective networks), the backpropagation from the different output nodes can be performed in parallel.

It will thus be appreciated that embodiments of the present disclosure provide a system and method involving a stochastic neural network with nodes, synapses and processing elements, wherein each of the synapses provides a connection between a respective pair of the nodes, and wherein each of the processing elements is embedded in a respective synapse, wherein each of the processing elements is adapted to receive an input and generate an output based on the input, wherein the output of one of the synapses feeds into a first subset of the plurality of nodes and has a synaptic value computed according to a path preceding that synapse. The computational load of the stochastic neural network can be balanced based on enhancing diverse activation of the plurality of nodes as described herein. As described elsewhere herein, the diverse activation of the nodes can be conducted by minimizing auto-covariance of outputs associated with each of the plurality of synapses, by targeting a firing rate of a first node of the first subset of the plurality of nodes, by determining a resource usage value for each of the plurality of synapses and where the resource usage value can be a function of one or more recent activations or one or more activation attempts, and/or by regularizing the stochastic neural network based on an action affecting at least one of the plurality of nodes.

As disclosed herein, the dual task of solving both the inference problem and computational graph can be facilitated via equation 4, for example, for activated and/or computed synapses. However, the same cannot be done for the synapses that were computed but do not have a direct and active link to the output node. A synapse's active link with respect to an output node is defined as a path from the synapse to the output node formed only by either computed or activated synapses. Computed synapses that stem from nodes with an active link but that do not have an active link themselves to the training path's output node have contributed to the inference by preventing a different graph from being activated, which would have resulted in a different, possibly inferior, output. Ignoring the training of these synapses would result in additional stochasticity of the output as untrained synapses would, at times, fire and change the computational graph. Nevertheless, the task of training these computed synapses without an active link would require knowing the alternative output that an active link would create, at least in expectation.

In order to approximate the effect that these end-of-the-line synapses (i.e., computed synapses that stem from a node with an active link to the output but that do not have an active link themselves), the property of asymptotic equipartition for stochastic processes can be leveraged. In essence, if we define the currently sampled computational graph as $g_k$ for a specific k out of a large number of possible distinct computational graphs, the output of the network y, inclusive of all graphs, not yet computed, is defined as in equation 12.

$$y = \frac{p(g_k)y_k + \sum_{i \neq k} p(g_i) y_i}{p(g_k) + \sum_{i \neq k} p(g_i)} \qquad \text{Equation 12}$$

with $p(g_k)$ the probability of sampling the computational graph $g_k$ and $y_k$ the output of graph $g_k$. Equation 12 can be the approximated with equation 13.

$$y = \frac{p(g_k)y_k + (1 - p(g_i))\hat{y}_{\neg k}}{p(g_k) + (1 - p(g_k))} \qquad \text{Equation 13}$$

where the challenge is in computing the expected output of all other computational graphs that are not k, namely $\_\hat{y}\neg k$. Computing alternative values exactly is not feasible, yet two simple approximations work in practice: $\_\hat{y}\neg k \approx 0.5$ or, for unbalanced data, $\_\hat{y}\neg k \approx \bar{y}t$. i.e. the recent average output (taking, for example, an exponentially weighted moving average).

Equation 13 is now easily differentiable per equation 14 below.

$$p(g_k) = \prod_{j \in g_k} p(s_j) \prod_{l \in \neg g_k} (1 - p(s_l)) \qquad \text{Equation 14}$$

denoting $j \in g_x$ all the activated synapses of graph $g_k$ and $l \in \neg g_k$ all the synapses that were sampled by $g_k$ but did not contribute to the solution, i.e., the very synapses to be trained. Substituting a fixed multiplier, $\beta$, for all the terms in equation 14 except for the sampled but not activated synapse, $s_u$, we are looking to train, the derivative of equation 15 is obtained. In various embodiments, a constant $\beta$ value of 0.1 can be employed.

$$\frac{\partial \ln(y)}{\partial p(s_u)} = -\frac{1}{y}\beta \qquad \text{Equation 15}$$

Given the stochastic nature of this graph, where the synaptic output of equation 4 is de facto the probability of a path getting past the synapse for a given inference point, a graph can be obtained that is unable to reach any of the output nodes for a given inference point. This can occur in the initial stages, depending on the initialization construct utilized, or throughout the training as incorrectly classified points get inhibited and/or regularization limits the firing of nodes and synapses. Unless a method to explore the graph under such circumstances is employed, there may be a likely unrecoverable failure. As such, key elements in guiding exploration of the graph include assessing the number of paths run for a given inference. The more paths run without a successful estimation, or indeed the closer to the maximum number of paths allowed, the more likely it is that more of the computational graph should be explored. Further, the less utilized a synaptic path is, the more of a candidate it may be to be explored. The more likely a path is from the current node, the more of a candidate it may be for forced exploration (in other words, over-writing as little as possible). A forced connection should change the current synaptic parameters as little as possible to achieve its exploratory goal. Another element in guiding exploration is promoting a connection that has a likely positive relationship with the output, which can be termed as the synaptic charge of an inference point, for example. As described herein, exploring the stochastic neural network can include determining a likelihood of exploration based on a count of paths that have been initiated from the plurality of paths.

It will thus be appreciated that embodiments of the present disclosure provide a system and method involving a stochastic neural network with nodes, synapses and processing elements, wherein each of the synapses provides a connection between a respective pair of the nodes, and wherein each of the processing elements is embedded in a respective synapse, wherein each of the processing elements is adapted to receive an input and generate an output based on the input, wherein the output of one of the synapses feeds into a first subset of nodes and has a synaptic value computed according to a path preceding that synapse, and wherein the first subset of nodes is a first subset of activated nodes, wherein the system and/or method operate to train the stochastic neural network. As described herein, the training can include updating the synaptic value of the first synapse and updating the first subset of activated nodes. The training can separately involve back propagating from each node of a subset of the nodes to one or more input nodes along a path. It will be appreciated that the path can include one or more paths and the back propagation along the path can include back propagation along one or more paths that activated the first subset of the plurality of nodes. In various embodiments, the training involves training a subset of computed but not activated synapses.

Regularization can be employed to reduce the overall time of computation, to reduce the computational load and/or to increase the precision of each stochastic inference. An effective way to achieve these goals is to promote nodal activation diversity, as described elsewhere herein. The speed of computation can be reduced by using fewer synapses, the precision and robustness can be increased by using a wider variety of synapses for different inference tasks, and the computational load can be minimized by limiting the firing rate of synapses.

In addition or as an alternative to targeting nodal activation diversity, a variety of different methods of regularization applicable to SSGs can be employed in accordance with the present disclosure. For example, co-activation of a node can be employed, including penalizing late activations. This approach is focused on penalizing synapses that activate a node that is already activated by a different synapse on the same path. It provides the dual benefits of ensuring that the node activation is driven by a single central activating path (which allows for the greatest backpropagation signal for deep networks when using the OR gate) alongside naturally promoting faster networks (when we have a network with connections that skip layers). Another approach that can be employed is node activation dependent on the total number of activated nodes (absolute, squared, etc.). This is the simplest form of regularization, which minimizes the overall resource utilization of the network. Another approach that can be employed is maximizing entropy at each node or at each synapse (with possible adjustment for activation bias). While maximizing entropy in general has been used in neural networks, maximizing entropy at the node level for SSGs requires a different approach, including viewing entropy as the probability of node activation over successive draws within the wave and adjusting for the sampling process, i.e., the fact that entropy is measured only when a node has been activated. Another approach involves regularization based on the difference between the number of initiated paths and the number of paths that have activated the objective nodes (with the advantage that a negative difference promotes activation). In other words, an equal number of initiated and completed paths are targeted. Another approach is regularization based on the criticality of the branching process, such as the difference between the total input probability of a node's incoming synapses and the total output probability of the outgoing synapses, for example. This approach directly modulates the overall activity which, in expectation, will correspond to the number of activated input nodes (noting that the branching process can be computed at the outgoing synapses' level or at the destination nodes' level fanning from a specific node). Another approach involves regularization based on promoting nodal diversity as described elsewhere herein. Another approach involves enhanced regularization of a subset of nodes that has been recently activated.

It will be appreciated that embodiments of the approach as described herein permit multiple paths to be run in parallel through the graph. Since nodes are selectively activated, the computational lock over a node/synapse is selectively applied, allowing for multiple paths to compute in parallel, for example, at or substantially at the same time. For purposes of the present disclosure, "substantially at the same time" can mean nearly at the same time, approximately at the same time, very close to the exact same time, essentially at the same time as well as exactly the same time. Each path can activate one or more output nodes, thus providing the ability to train a multi-objective network (i.e., a network with multiple output nodes that are not necessarily mutually exclusive). The signature of a path, saved at synaptic activation level, allows for efficient training of the network over multiple objectives as described herein.

In various embodiments, the probability of activation can be modulated directly by adding a penalty for the probability of nodal activation. This will reduce the number of nodes fired, which will depend on the difficulty of the specific input sample/query once the network is trained. This form of activation regularization can be constant across the network or depend on the state of the network, the phase of training (e.g., initial versus late-stage fine-tuning), etc.

It will be appreciated that embodiments of the present disclosure allow for different types of synapses and/or nodes with different activation functions to co-exist depending on the problem (e.g., a binary input to solve SAT-3 style problems or a continuous input to solve a visual recognition task). It will further be appreciated that the neural network construct according to the present disclosure is applicable to a wide variety of problems, in the domain of supervised and unsupervised learning, such as vision and speech recognition, etc. The presently disclosed system, method and network thus facilitate construction of larger networks where the network need not be computed in its entirety every time, along with the construction of more technically efficient networks, both computationally and in terms of energy consumption, which is well suited for mobile devices where energy consumption is naturally constrained, for example.

According to various embodiments of the present disclosure, a system can include one or more nodes and one or more synapses, wherein each synapse of the plurality of synapses connects a respective pair of the plurality of nodes. The system can further include one or more processing elements, wherein each of the processing elements is embedded in a respective synapse, and wherein each of the processing elements is adapted to receive an input and generate an output based on the input. The system can be configured to operate such that, upon receipt of a first problem input, a first subset of the nodes is selectively activated. In various embodiments, upon receipt of a second problem input, a second subset of the nodes is selectively activated. The second subset of nodes is different from the first subset of nodes. In various embodiments, the second subset of nodes is selectively activated at substantially the same time as the first subset of nodes.

Figure 12:
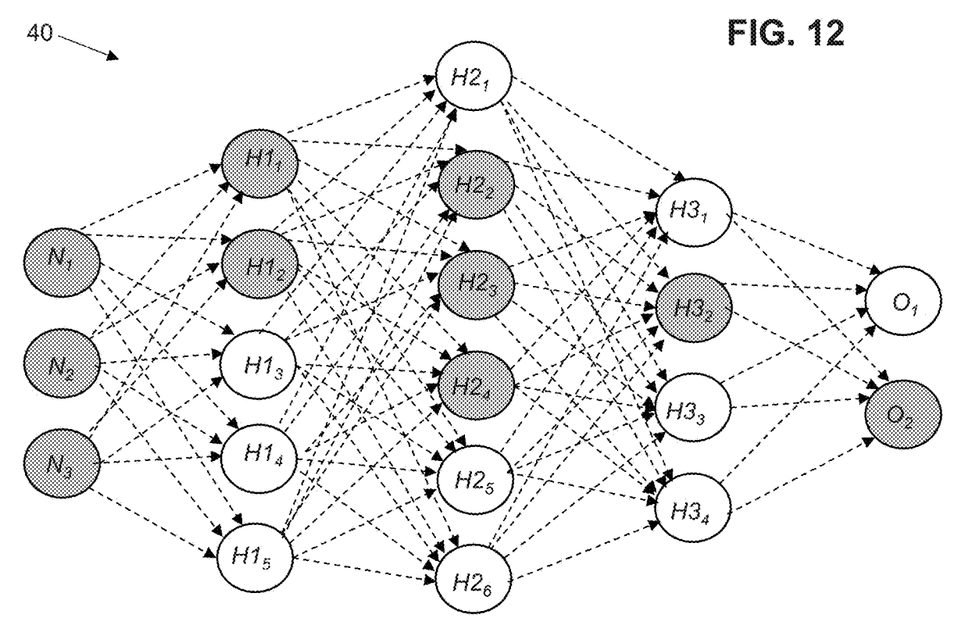
FIGS. 12 and 13 are diagrams of a stochastic neural network showing selective activation in accordance with embodiments of the present disclosure.
Figure 13:
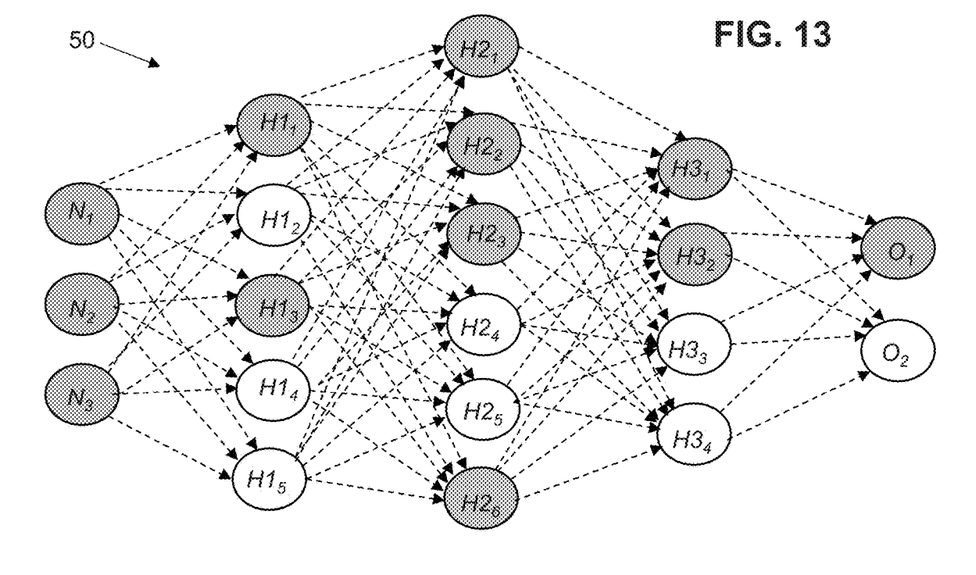

FIGS. 12 and 13 are diagrams of a stochastic neural network showing selective activation in accordance with embodiments of the present disclosure. As shown in FIG. 12, a first problem input is received which activates a specific set of nodes N1, N2, N3, $H1_1$, $H1_2$, $H2_2$, $H2_3$, $H2_4$, $H3_2$ and $O_2$, which are shaded in gray.

As shown in FIG. 13, a second problem input is received, which activates a different set of nodes N1, N2, N3, $H1_1$, $H1_3$, $H2_1$, $H2_2$, $H2_3$, $H2_6$, $H3_1$, $H3_2$ and $O_1$, shown with gray shading. As the node activation depends on the specific problem input, multiple inputs can be run over the network in parallel, i.e., at the same time or essentially the same time, augmenting node activation including the output node with details of the problem input that caused the activation. It will be appreciated that the node and/or synaptic computation is specific for each problem input being run concurrently over the network. Of note, the concurrent computation across the network can be performed over distinct problem inputs and/or over multiple stochastic samples for the same problem input (the latter no longer needing indexing activation by problem input). In various embodiments, the concurrent computation can be coded as paths that traverse the network, selectively activating one or more output nodes (or none). Each path is run independently, with the fire-and-compute approach seamlessly utilizing the latest available computed synaptic value associated with the path's problem input, regardless of the path that has activated it. This approach allows concurrent computations to run across the network, both across problem inputs and samples: the larger the network, the less likely are two paths to activate the same node at the same time, which reduces the potential for a computational lock. Further, two different problem inputs are unlikely to activate the same set of nodes. In other words, embodiments of the present disclosure provide increased efficiency the larger a network grows and/or the more diverse a set of problem inputs are queried simultaneously.

In various embodiments, once a synapse is computed, the sampling of the synapse determines whether the next node will be activated. However, inputs to the subsequent nodes can be the exact values of the incoming synapse as opposed to repetitive sampling. The computed value of a synapse may be used by a subsequent node and/or subsequent synapses even when the synapse is not activated. It will be appreciated that each of the synapses is operable to control activation of at least one of the nodes and each synapse has one or more associated activation weights.

In various alternative embodiments, modulation at the synapse level can be performed, where each node computes a single output as per a classical neural network model and the modulation is distinct in every synapse.

As described herein, it will be appreciated that the activation probability of the previous node (or synapse) is combined with the subsequent synapses' signal to form the output of each outgoing synapse. This creates a chain of dependence for the activated output nodes with all of the preceding activations, thus allowing the network to be trained both on the signal and on the activation probability. Since a computed synapse/node may be used regardless of activation, inasmuch as a node/synapse receiving that information has been activated via a different pathway, the network can be configured, manually or in training, to have fully activated pathways that run alongside signal pathways, the former propagating the signal and the latter computing the signal.

As described, the present disclosure contemplates a variety of different systems each having one or more of a plurality of different features, attributes, or characteristics. A "system" as used herein can refer, for example, to various configurations of one or more computing networks, processing elements or computing devices, such as desktop computers, laptop computers, tablet computers, personal digital assistants, mobile phones, and other mobile computing devices. In certain embodiments in which the system includes a computing device, the computing device is any suitable computing device (such as a server) that includes at least one processor and at least one memory device or data storage device. As further described herein, the computing device includes at least one processor configured to transmit and receive data or signals representing events, messages, commands, or any other suitable information. The processor of the computing device is configured to execute the events, messages, or commands represented by such data or signals in conjunction with the operation of the computing device. As described elsewhere herein, embodiments of the disclosure can be developed on specialized hardware where nodes and synapses contain the calculation (and stochastic sampling) capabilities.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs, processing elements or components. These programs, processing elements and/or components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices, elements or components of the present disclosure that are in communication with each other do not need to be in continuous communication with each other. Further, devices, elements or components in communication with other devices or components can communicate directly or indirectly through one or more intermediate devices, elements or components or other intermediaries. Further, descriptions of embodiments of the present disclosure herein wherein several devices, elements and/or components are described as being in communication with one another does not imply that all such devices, elements or components are required, or that each of the disclosed devices, elements or components must communicate with every other device, element or component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers, processing elements and/or computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A method of operating a stochastic neural network, comprising:
providing a stochastic neural network comprising a plurality of nodes, a plurality of synapses and a plurality of processing elements, wherein each of the plurality of synapses comprises a connection between a respective pair of the plurality of nodes, and wherein each of the plurality of processing elements is embedded in a respective synapse of the plurality of synapses, wherein each of the plurality of processing elements is adapted to receive an input and generate an output based on the input, wherein the output of a first synapse of the one or more of the plurality of synapses feeds into a first subset of the plurality of nodes and comprises a first synaptic value computed according to a first output of a first node, wherein the output of a second synapse of the one or more of the plurality of synapses comprises a second synaptic value computed according to a second output of the first node, wherein the second output of the first node is distinct from the first output of the first node, wherein, upon receipt of a first problem input, at least a portion of the stochastic neural network is selectively activated by one or more of the plurality of processing elements embedded in one or more of the plurality of synapses; and
balancing a computational load of the stochastic neural network based on enhancing diverse activation of the plurality of nodes.

2. The method of claim 1, wherein the diverse activation of the plurality of nodes comprises minimizing auto-covariance of outputs associated with each of the plurality of synapses.

3. The method of claim 1, wherein the diverse activation of the plurality of nodes comprises targeting a firing rate of a first node of the first subset of the plurality of nodes.

4. The method of claim 1, wherein the diverse activation of the plurality of nodes comprises determining a resource usage value for each of the plurality of synapses and where the resource usage value is a function of one or more recent activations or one or more activation attempts.

5. The method of claim 1, wherein the diverse activation of the plurality of nodes comprises regularizing the stochastic neural network based on an action affecting at least one of the plurality of nodes.

6. A method of operating a stochastic neural network, comprising:
providing a stochastic neural network comprising a plurality of nodes, a plurality of synapses and a plurality of processing elements, wherein each of the plurality of synapses comprises a connection between a respective pair of the plurality of nodes, and wherein each of the plurality of processing elements is embedded in a respective synapse of the plurality of synapses, wherein each of the plurality of processing elements is adapted to receive an input and generate an output based on the input, wherein the output of a first synapse of the one or more of the plurality of synapses feeds into a first subset of the plurality of nodes and comprises a first synaptic value computed according to a first output of a first node, wherein the output of a second synapse of the one or more of the plurality of synapses comprises a second synaptic value computed according to a second output of the first node, wherein the second output of the first node is distinct from the first output of the first node, wherein the first subset of the plurality of nodes comprises a first subset of activated nodes, wherein, upon receipt of a first problem input, at least a portion of the stochastic neural network is selectively activated by one or more of the plurality of processing elements embedded in one or more of the plurality of synapses; and
training the stochastic neural network.

7. The method of claim 6, wherein the training comprises updating the synaptic value of the first synapse and updating the first subset of activated nodes.

8. The method of claim 6, wherein the training comprises back propagating from each of the first subset of the plurality of nodes to one or more input nodes along a path.

9. The method of claim 8, wherein the path comprises one or more paths that activated the first subset of the plurality of nodes.

10. The method of claim 6, wherein the training comprises training a subset of computed but not activated synapses from the plurality of synapses.

11. The method of claim 6, further comprising exploring the stochastic neural network.

12. The method of claim 11, wherein the first synaptic value is further computed according to a path preceding the first synapse, wherein the path comprises a plurality of paths and wherein exploring the stochastic neural network comprises determining a likelihood of exploration based on a count of paths that have been initiated from the plurality of paths.

13. The method of claim 11, wherein the first synaptic value is further computed according to a path preceding the first synapse, wherein the path comprises a plurality of paths and wherein exploring the stochastic neural network comprises exploring at least one less utilized path of the plurality of paths.

14. The method of claim 11, wherein the first synaptic value is further computed according to a path preceding the first synapse, wherein the path comprises a plurality of paths and wherein exploring the stochastic neural network comprises promoting a connection that has a likely positive relationship with the output.

15. A method of operating a stochastic neural network, comprising:
   providing a stochastic neural network comprising a plurality of nodes, a plurality of synapses and a plurality of processing elements, wherein each of the plurality of synapses comprises a connection between a respective pair of the plurality of nodes, and wherein each of the plurality of processing elements is embedded in a respective synapse of the plurality of synapses, wherein each of the plurality of processing elements is adapted to receive an input and generate an output based on the input, wherein the output of a first synapse of the one or more of the plurality of synapses feeds into a first subset of the plurality of nodes and comprises a first synaptic value computed according to first output of a first node, wherein the output of a second synapse of the one or more of the plurality of synapses comprises a second synaptic value computed according to a second output of the first node, wherein the second output of the first node is distinct from the first output of the first node, wherein, upon receipt of a first problem input, at least a portion of the stochastic neural network is selectively activated by one or more of the plurality of processing elements embedded in one or more of the plurality of synapses; and
   regularizing the stochastic neural network.

16. The method of claim 15, wherein regularizing the stochastic neural network is based upon co-activation of a node.

17. The method of claim 15, wherein regularizing the stochastic neural network is based upon activation of a node dependent upon a total number of activated nodes.

18. The method of claim 15, wherein regularizing the stochastic neural network comprises maximizing entropy at each node or at each synapse in the stochastic neural network with an adjustment for activation bias.

19. The method of claim 15, wherein the action comprises enhanced regularization of the first subset of the plurality of nodes, wherein the first subset has been recently activated.

20. The method of claim 15, wherein the action comprises the difference between a number of initiated paths and a number of paths that have activated one or more objective nodes.

21. The method of claim 15, wherein the action comprises the difference between a total input probability of incoming synapses from the plurality of synapses to a first node of the plurality of nodes and a total output probability of outgoing synapses from the plurality of synapses of the first node.

22. The method of claim 15, wherein the action comprises a temporal diversity of output synapses of the plurality of synapses viewed as a vector.

23. A computing system, comprising:
   a stochastic neural network comprising:
      a plurality of nodes;
      a plurality of synapses, wherein each synapse of the plurality of synapses connects a respective pair of the plurality of nodes, wherein each synapse of the plurality of synapses comprises an activation weight, wherein each of the plurality of synapses is operable to control activation of at least one of the plurality of nodes, and wherein a subset of the plurality of synapses shares a first activation weight, wherein the output of a first synapse of the plurality of synapses feeds into a first subset of the plurality of nodes and comprises a first synaptic value computed according to a-first output of a first node, wherein the output of a second synapse of the plurality of synapses comprises a second synaptic value computed according to a second output of the first node, and wherein the second output of the first node is distinct from the first output of the first node; and
   a plurality of processing elements, wherein each of the plurality of processing elements is embedded in a respective synapse of the plurality of synapses, wherein, upon receipt of a first problem input, at least a first portion of the stochastic neural network is selectively activated by one or more of the plurality of processing elements embedded in one or more of the plurality of synapses.

24. The computing system of claim 23 wherein, upon receipt of a second problem input, at least a second portion of the stochastic neural network is selectively activated by one or more of the plurality of processing elements embedded in one or more of the plurality of synapses, wherein the first portion of the stochastic neural network comprises a first subset of nodes, wherein the second portion of the stochastic neural network comprises a second subset of nodes, and wherein the first subset of nodes is different from the second subset of nodes.

25. The computing system of claim 24, wherein activation of the first portion of the stochastic neural network is in parallel with the activation of the second portion of the stochastic neural network.

* * * * *